United States Patent [19]

Day et al.

[11] Patent Number: 4,831,983
[45] Date of Patent: May 23, 1989

[54] STEPPER MOTOR CONTROL FOR FUEL INJECTION

[75] Inventors: Eric Day, Longmeadow; John H. Field, II, Hampden, both of Mass.

[73] Assignee: AIL Corporation, Columbia, S.C.

[21] Appl. No.: 110,532

[22] Filed: Oct. 16, 1987

Related U.S. Application Data

[63] Continuation of Ser. No. 844,055, Mar. 26, 1986, abandoned.

[51] Int. Cl.$^4$ ............................................. F02M 39/00
[52] U.S. Cl. .................................... 123/357; 123/372; 123/494
[58] Field of Search ............... 123/372, 357, 358, 359, 123/494

[56] References Cited

U.S. PATENT DOCUMENTS

| | | | |
|---|---|---|---|
| 3,726,608 | 4/1973 | Bostwick et al. | 417/212 |
| 4,033,310 | 7/1977 | Nicolls | 123/139 |
| 4,212,229 | 7/1980 | Ohtani | 123/357 |
| 4,265,200 | 5/1981 | Wessel et al. | 123/501 |
| 4,305,362 | 12/1981 | Schartz | 123/372 |
| 4,444,048 | 4/1984 | Nitschke et al. | 73/117.3 |
| 4,463,729 | 8/1984 | Bullis et al. | 123/478 |
| 4,481,469 | 11/1984 | Hauler et al. | 324/174 |
| 4,482,823 | 11/1984 | Wessel | 307/519 |
| 4,502,437 | 3/1985 | Voss | 123/357 |
| 4,503,391 | 3/1985 | Hinke | 324/408 |
| 4,523,562 | 6/1985 | Schnapper | 123/357 |
| 4,526,146 | 7/1985 | Djordjevic | 123/357 |
| 4,530,327 | 7/1985 | Böhm et al. | 123/357 |
| 4,601,270 | 7/1986 | Kimberley | 123/494 |

*Primary Examiner*—Carl Stuart Miller
*Attorney, Agent, or Firm*—Richard D. Weber; Albert L. Free

[57] ABSTRACT

A stepper motor (40) is used to position the pump rack (32A) via a preloaded compliant linkage (52,54,56) in a fuel injection pump (18), thereby exercising control over the end of injection event in response to various engine operating parameters. One part (52) of the compliant linkage (52,54,56) is engaged with the output shaft (46) of the stepper motor (40). The stop (96) is provided at the zero throttle position of the engaged part (52) of the linkage (52,54,56), at the exteme distal end of its positional range. A position sensor (100) is located at a predetermined reference position away from the stop (96) to provide a signal indicative of the engaged part (52) being at that position. When the stepper motor (40) is advanced to move the engaged part (52) away from the stop (96), the pulse count to the stepper motor is rereferenced when the reference position is reached.

2 Claims, 1 Drawing Sheet

STEPPER MOTOR CONTROL FOR FUEL INJECTION

This is a continuation of co-pending application Ser. No. 844,055 filed on Mar. 26, 1986 abandoned.

CROSS REFERENCE TO RELATED APPLICATIONS

Cross reference is made to copending, commonly-owned U.S. patent application Ser. No. 844,059, filed on even date herewith by Eric S. Brisbon et al.

TECHNICAL FIELD OF THE INVENTION

The invention relates to fuel injection for internal combustion engines.

BACKGROUND OF THE INVENTION

In the wake of recent stringent emissions controls and high fuel prices, it has become increasingly important to provide precise control over the combustion process in internal combustion engines. The invention is discussed in the context of diesel engines.

A typical fuel injection pump for a diesel engine comprises a pressurized fuel source, a plunger valve which meters the fuel to each cylinder's fuel injector, a camshaft operating the plungers up and down, and a rack arrangement for rotationally positioning the plungers.

The camshaft is driven in syntony (at the same speed) with an engine fuel pump drive shaft, but at a variable advance angle thereto. The advance angle determines the onset of injection.

The rack is typically moved within a limited range of linear positions to determine a limited range of plunger rotational positions by a throttle control and a flyweight arrangement driven off of the camshaft. The rotational position of the plungers determines the end of fuel metering, and hence the fuel quantity delivered.

A flyweight arrangement involves many moving parts.

U.S. Pat. No. 4,502,537 (Voss, 1985) discloses (in FIG. 6) positioning the pump rack with a stepping motor actuator (106), and having a reference stop (230) at the zero throttle position to initialize the stepper motor by causing it to move the pump rack linkage (202) in the direction of the reference stop. Reinitialization is assured at this point by providing as many pulses to the stepper motor as there are in the full stroke of the motor (see column 11, lines 36–50).

U.S. Pat. No. 4,570,588 (Herdin, et. al., 1986) discloses (in FIG. 1) positioning a control rod (2) with a stepping motor (10) through the intermediary of a resiliently yieldable coupling comprising a coupling plate (11) fixed to the output shaft of the stepping motor and driving through coupling pins (12,12a) and a tension spring (14), a camwheel (7) that urges the control rod. The spring (14) acts as an energy storage device to alleviate the possibility of a phase shift (position error) between the stepping motor and the control rod. This possibility may arise if the control rod load exceeds the stepping motor output.

European Patent Application No. 0,069,111 (Stipek, et. al., 1983) discloses positioning a control rod (17) with a stepper motor (4) via a pinion gear (5) on the motor moving a toothed rack (6) that is coupled to the control rod via a double-acting resilient linkage that involves a prestressed compression spring (11).

DISCLOSURE OF THE INVENTION

It is an object of this invention to provide a technique for controlling fuel metering with a stepper motor actuator operating in a reliable open-loop manner.

According to the Invention, a stepper motor is used to position the pump rack via a preloaded compliant linkage in a fuel injection pump, thereby exercising control over the end of injection event in response to various engine operating parameters. One part of the compliant linkage is engaged with the output shaft of the stepper motor. A stop is provided at the closed throttle position of the engaged part of the linkage, at the extreme distal end of its positional range.

A position sensor is located at a predetermined reference position away from the stop to provide a signal indicative of the engaged part being at that position. When the stepper motor is advanced to move the engaged part away from the stop, the pulse count to the stepper motor is rereferenced when the reference position is reached.

According to an aspect of the invention, the reference position is located a distance at least one-quarter of the repeating stepper motor excitation coil sequence away from the stop.

Other objects, features, and advantages of the invention will become apparent in light of the following description thereof.

BEST MODE FOR CARRYING OUT THE INVENTION

Figure 1:
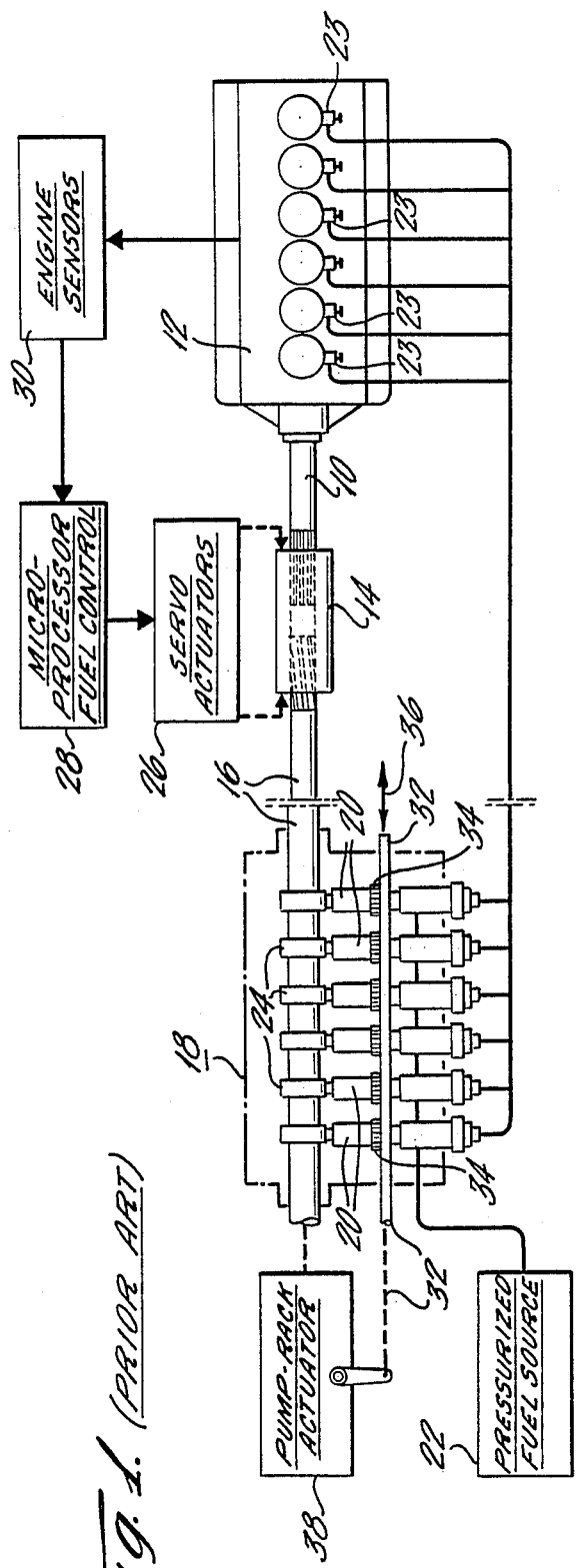
FIG. 1 is a schematic of a prior art fuel injection system.

FIG. 1 shows a prior art fuel injection system.

A pump drive shaft 10 is driven by an engine 12. The pump drive shaft 10 is coupled via a helicallysplined sleeve 14 to the camshaft 16 of a fuel pump 18. Individual plungers 20 in the fuel pump 18 supply a metered fuel charge from a pressurized fuel source 22 to injectors 23 for the individual cylinders of the engine 12 in response to the urgings of individual lobes 24 on the camshaft 16.

The sleeve 14 is axially positionable by servo actuators 26 to vary the relative angular position (timing) of the camshaft 16 with respect to the pump drive shaft 10, within a limited range of relative angular positions, while driving the camshaft in syntony with the fuel pump drive shaft. The camshaft timing determines the onset of injection.

The servo actuators 26 are responsive to a control signal from a microprocessor-based fuel control 28, which receives as inputs, signals from engine sensors 30 indicative of engine operating parameters such as speed, position, temperature, load and throttle lever setting. A pump rack 32 is disposed tangentially to the plungers 20 and is attached thereto by suitable means 34. The rack 32 is longitudinally positionable, as indicated by the double-ended arrow 36, by an actuator 38. In response to longitudinal motion of the pump rack 32, the plungers 20 are rotated simultaneously about their axes. The plungers 20 are provided with conventional helical slots which cooperate with spill ports, so that the angular position of the plungers about their axes determines the end of the injection event, and hence the quantity of fuel which is injected.

Figure 2:
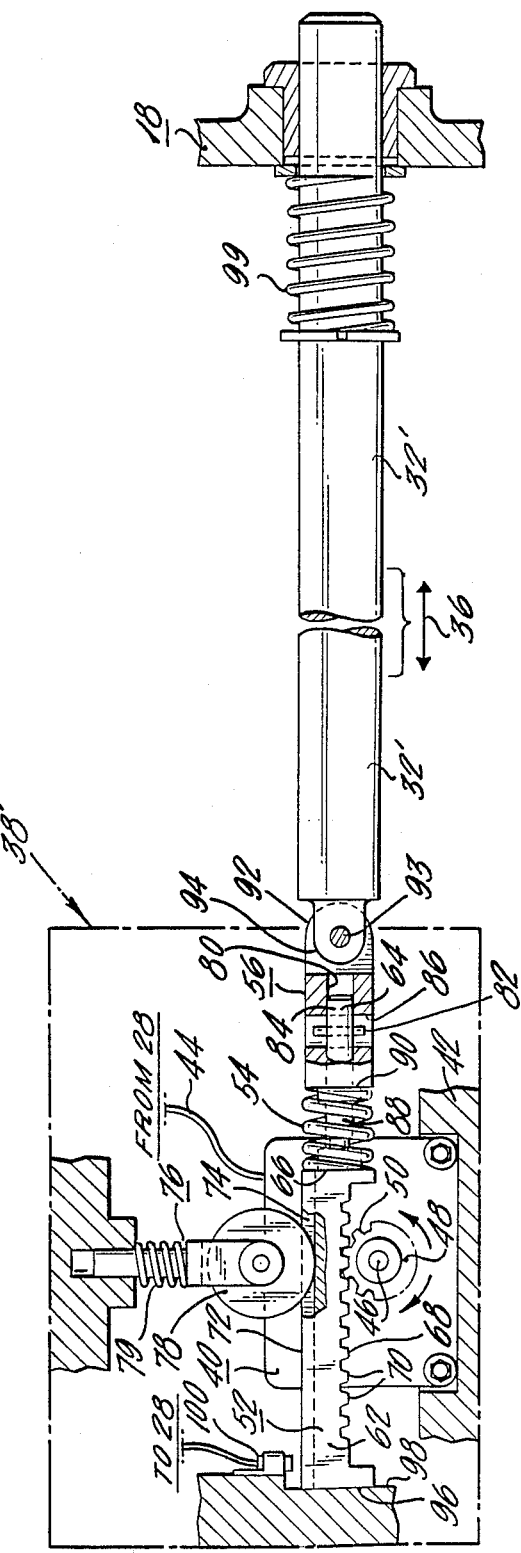
FIG. 2 is a side view, martially broken away and partially in cross section of the stepper motor control for fuel injection of this invention.

FIG. 2 shows the mechanism of this invention within the phantom lines 38 (corresponding to element 38 of FIG. 1) for linearly actuating a fuel injection pump rack 32 (similar to the rack 32 of FIG. 1).

An electromechanical actuator, such as a fine angle stepper motor 40, is mounted in a housing 42 and is responsive to a desired pump rack position signal on a line 44 from the electronic fuel control 28 for open-loop operation. The output shaft 46 of the motor 40 carries a pinion gear 48 having teeth 50.

A preloaded, compliant linkage comprising a rack member 52, a spring 54, and a clevis member 56 is disposed in-line with the pump rack 32, between the pinion gear 48 and the pump rack 32, to position the pump rack 32A linearly (as indicated by the arrows 36) in response to the rotational position of the pinion gear 48 which is dictated by the controller.

With regard to FIG. 2, the term "proximal" refers to those elements or portions of elements disposed towards the pump rack 32, and the term "distal" refers to those elements or portions of elements disposed away from the pump rack.

COMPLIANT LINKAGE

The rack member 52 has two portions; a longitudinal rectangular portion 62, and a rod portion 64 extending longitudinally from the proximal end 66 of the rectangular portion 62 toward the pump rack 32. One side 68 of the rectangular portion 62 has teeth 70 that mesh with the pinion gear teeth 50, and the opposite side 72 is provided with a longitudinal groove 74.

A spring-loaded mechanism 76 is disposed in the housing 42 transverse to the rack member 52, and has a wheel 78 that rides in the groove 74. The wheel 78 is urged against the rack member 52, towards the pinion 48 by a spring 79. Zero backlash of the rack and the pinion is achieved by the profile of the teeth 50 and 70, and by the force of the spring 79 which loads the rack radially toward the pinion gear 48.

The proximal end 92 of the clevis member 56 is transversely (parallel to the output shaft 46) pinned by a pin 93 to the distal end 94 of the pump rack 32 so that the rack member 52 can pivot towards the pinion ear 48, thereby insuring maximum engagement of the teeth 50,70 in response to the urgings of the spring-loaded mechanism 76. The spring force of this mechanism 76 is determined by, and is a function of, the maximum force exerted by the pinion gear teeth 50 in meeting a mechanism load. The load is a force directed along the involute path of the teeth, which has a radial component that must be overcome by the spring in order for the teeth to remain in contact. The rack teeth 50 load both sides of one or more pinion teeth 70. The spring force will also compensate for wear with zero backlash. The design objective for the profile of the teeth 50 and 70 is to minimize backlash and sliding contact, and to maximize rolling contact.

By reason of the spring force, as the compliant linkage load increases to approach a maximum as defined by the spring 54, the driving side load of the pinion teeth approaches maximum while the backside tooth load approaches zero. Hence, the efficiency of the drive mechanism (i.e., tooth meshing) increases as the load increases.

For conditions of malfunction, such as load seizure when the motor 40 might be unable to put out limit torque, and exceed the capability of the spring 79, the spring stroke is limited by a disengagement stop so as to permit the rack teeth 70 to ride up on the pinion teeth 50, without permitting disengagement of the teeth. If the tooth load exceeds normally calculable values, such as may occur upon a pump rack seizure, tooth disengagement is prevented up to the point of outright tooth failure.

The compliant linkage avoids the need for the tight control of centerline distance between pinion and rack, permitting the motor and mechanism load to be mounted in separate housings.

The rod portion 64 of the rack member extends longitudinally into a longitudinal hole 80 in the distal end 90 of the clevis member 56. A press-fit pin 82 extends transversely through the proximal end 84 of the rod portion 64, and extends past the diameter of the rod portion 64 into a longitudinally elongated transverse slot 86 in the midsection of the clevis member 56.

The rod portion 64 is not fully inserted into the hole 80 in the clevis portion 56. Rather, a section 88 of the rod portion 64 extends across a gap between the proximal end 62 of the rectangular portion 66 and the distal end 90 of the clevis member 56.

The spring 54 is a compression-type spring and is disposed in a partially preloaded (precompressed) state about the section 88 of the rod portion (in practice, prior to insertion of the pin 82) to exert a separating force between the rack member 52 and the clevis member 56. The necessity for the preloaded spring 54 is now discussed.

The linkage 52,54,56 avoids impact loads normally experienced with mechanisms driven by stepper motors, especially since in this context the stepper motor 40 has a characteristic motion which combines a high rotational rate of acceleration with oscillation (during operation) which could otherwise be damaging to a mechanism with backlash.

ELECTROMAGNETIC ACTUATOR

Stepper motors offer a number of advantages over alternative motion control actuators such as solenoids, voice coil, and D.C. servo motors. Excellent static and dynamic accuracy is maintained over the life of the system, sometimes without the need for closed-loop control by means of a position feedback sensor (although position feedback for closed-loop control may certainly be used).

In an open-loop system a micro-computer based controller keeps track of the stepper motor commanded (desired) position, and sequences the stepper motor phase excitation necessary to move to a new location at a given step rate.

In order to maintain the validity of the system, the physical incremental motion of the stepper motor rotor must keep phase with the commanded electrical phase excitation. This is not possible if the load on the motor exceeds its torque. For instance, in the case of a diesel engine jerk pump such as the pump 18, fuel is compressed by the cam-driven plungers 20 and movement of the pump rack 32 during a plunger pumping stroke can result in high transient loads. These transient loads are of significant duration during low engine speeds as encountered during engine starting.

This problem is overcome by providing the previously described compliant linkage 52,54,56 between the pinion gear 48 and the pump rack 32A. A torque margin is maintained between the stepper motor output and the load resistance. In the case of transient peak loads, the compliant linkage can yield longitudinally to avoid the transmission of these loads to the stepper motor. More specifically, the precompression of the spring 54 exceeds the normal operating load, but is less than the stepper motor output force (torque), so that the stepper motor can operate in phase during transient peak loads—full system accuracy being restored as the transient load reduces to normal and the spring 54 expands to its preload position.

The preloaded, compliant linkage 52,54,56 enables a smaller lighter, and lower cost stepper motor to be used for a given load, without compromising any of the advantages gained by using a stepper motor for the electromagnetic actuator.

In FIG. 2, the stepper motor 40 is illustrated in its closed position, with the distal end 96 of the rack portion 62 resting against a stop 98 in the housing 42. This position is assured by a spring 99 which exerts a distally-directed force on the rack member 52 via the pump rack 32A. Moving the rack member 52 against the stop 98 to rereference position, as taught in the aforementioned U.S. Pat. No. 4,502,537 (Voss, 1985), is useful, but has some inherent limitations in the context of open-loop stepper motor control. If the stepper motor is always started on one particular coil excitation, it may not be on the correct excitation phase unless a suitable adjustment technique is provided to implement this function. In other words, the stop position may not equal "zero" steps for the chosen coil excitation, it may be physically displaced therefrom.

Thus, it is advantageous to locate a rack member position sensor 100, such as a Hall effect sensor, at a predetermined reference position slightly away from the stop 98 (in the proximal direction) to sense a corresponding reference position for the rack member. This reference position is stored in the controller.

The reference position is located a distance at least one-quarter of the repeating stepper motor excitation coil sequence away from the stop 98. (The stepper motor excitation coils are excited sequentially in a repeating pattern.) A sufficient number of step pulses are provided by the controller 28 to the stepper motor to insure positional correspondence between the software (step count from the stored reference position in the controller 28) and the hardware (position of the rack member 52).

This technique compensates for occasional phase shifts between the actual and the desired stepper motor position. Thus, accurate positioning of the pump rack 32 can be achieved by the described combination of a stepper motor, compliant linkage, and reference position sensor without the need for continuously sensing pump rack position for feedback (closed-loop) control.

With the system described herein, pump rack position, and hence end of injection, is readily made dependent on a number of engine operating parameters, in a manner similar to the dependence of cam timing on these parameters; i.e., by development and implementation of suitable control algorithms in the controller 28.

We claim:

1. In a system comprising a fuel control rack movable along its length to control the injection of fuel into an engine, stepper motor means having a repeating stepper motor excitation coil sequence for moving said rack controlledly in either direction along its length in response to electrical control signals, stop means positioned adjacent one end of said rack for arresting said rack when said rack end abuts said stop means, electrical open-loop control means for controlling said stepper motor to position said rack at desired distances from a reference position of said rack, and means for moving said rack occasionally into a first position with said rack end against said stop means to accomplish reinitialization of said electrical control means, the combination therewith of sensor means for producing a reference signal indicative of when said rack is in said reference position, said reference position being spaced from said stop means by a distance "D" sufficient to permit said stepper motor to execute at least one quarter of said repeating motor excitation coil sequence while said rack moves from said first position to said reference position.

2. The system of claim 1, wherein said distance "D" is substantially equal to that required for said stepper motor to execute one quarter of said repeating motor excitation coil sequence while said rack moves from said first position to said reference position.

* * * * *